US009228364B1

(12) United States Patent
Dubose et al.

(10) Patent No.: US 9,228,364 B1
(45) Date of Patent: Jan. 5, 2016

(54) ADJUSTABLE WORK SURFACE FOR LARGE IRREGULARLY SHAPED OBJECTS

(71) Applicants: Adam Lewis Dubose, Hartsville, SC (US); Ronald W Bennett, Florence, SC (US); Rodrick Lafaye Williamson, Hemingway, SC (US)

(72) Inventors: Adam Lewis Dubose, Hartsville, SC (US); Ronald W Bennett, Florence, SC (US); Rodrick Lafaye Williamson, Hemingway, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 0 days.

(21) Appl. No.: 13/930,302

(22) Filed: Jun. 28, 2013

Related U.S. Application Data

(62) Division of application No. 12/875,448, filed on Sep. 3, 2010, now Pat. No. 8,499,889.

(51) Int. Cl.
  *E04G 1/15* (2006.01)
(52) U.S. Cl.
  CPC .................................... *E04G 1/15* (2013.01)
(58) Field of Classification Search
  CPC .............. E04G 1/152; E04G 7/28; E04G 1/15
  USPC .................. 182/115, 223, 132, 131, 222, 230
  See application file for complete search history.

(56) References Cited

U.S. PATENT DOCUMENTS

| | | | |
|---|---|---|---|
| 468,927 A | 2/1892 | Campbell | |
| 1,377,095 A * | 5/1921 | Rupp | 182/155 |
| 3,023,834 A * | 3/1962 | Buchanan | 182/223 |
| 3,128,842 A * | 4/1964 | Satrum | 182/149 |
| 3,256,955 A * | 6/1966 | Izmirian et al. | 182/115 |
| 3,556,254 A | 1/1971 | Lambert et al. | |
| 3,679,026 A | 7/1972 | Hansen et al. | |
| 4,121,690 A * | 10/1978 | Rawlings et al. | 182/45 |
| 4,293,054 A | 10/1981 | Pieri | |
| 5,016,735 A * | 5/1991 | Hodge | 182/223 |
| 5,067,589 A * | 11/1991 | Bartnicki | 182/223 |
| 5,301,770 A | 4/1994 | Regan et al. | |
| 5,310,018 A | 5/1994 | Lahaie | |
| 5,440,852 A * | 8/1995 | Lam | 53/377.2 |
| 6,340,070 B1 | 1/2002 | Villareal, Jr. et al. | |
| 7,000,733 B2 | 2/2006 | Cunniffe | |
| 7,086,500 B2 * | 8/2006 | Moss et al. | 182/119 |
| 8,566,992 B1 * | 10/2013 | Stokes | 14/69.5 |
| 2006/0169539 A1 * | 8/2006 | Grebinoski et al. | 182/223 |

* cited by examiner

*Primary Examiner* — Charles A Fox
*Assistant Examiner* — Kristine Florio
(74) *Attorney, Agent, or Firm* — John B. Hardway, III; Nexsen Pruet, LLC

(57) ABSTRACT

An adjustable work platform comprises a fixed platform carrying a multiplicity of adjustable members designed to slide out of the fixed platform to variable lengths as needed. A large irregularly shaped object, such as an aircraft, may be driven into the interior of the platform with the adjustable members retracted. Once in place, the adjustable members are extended to form a heavy duty work platform conforming to the irregular shape of the exterior of the object.

4 Claims, 3 Drawing Sheets

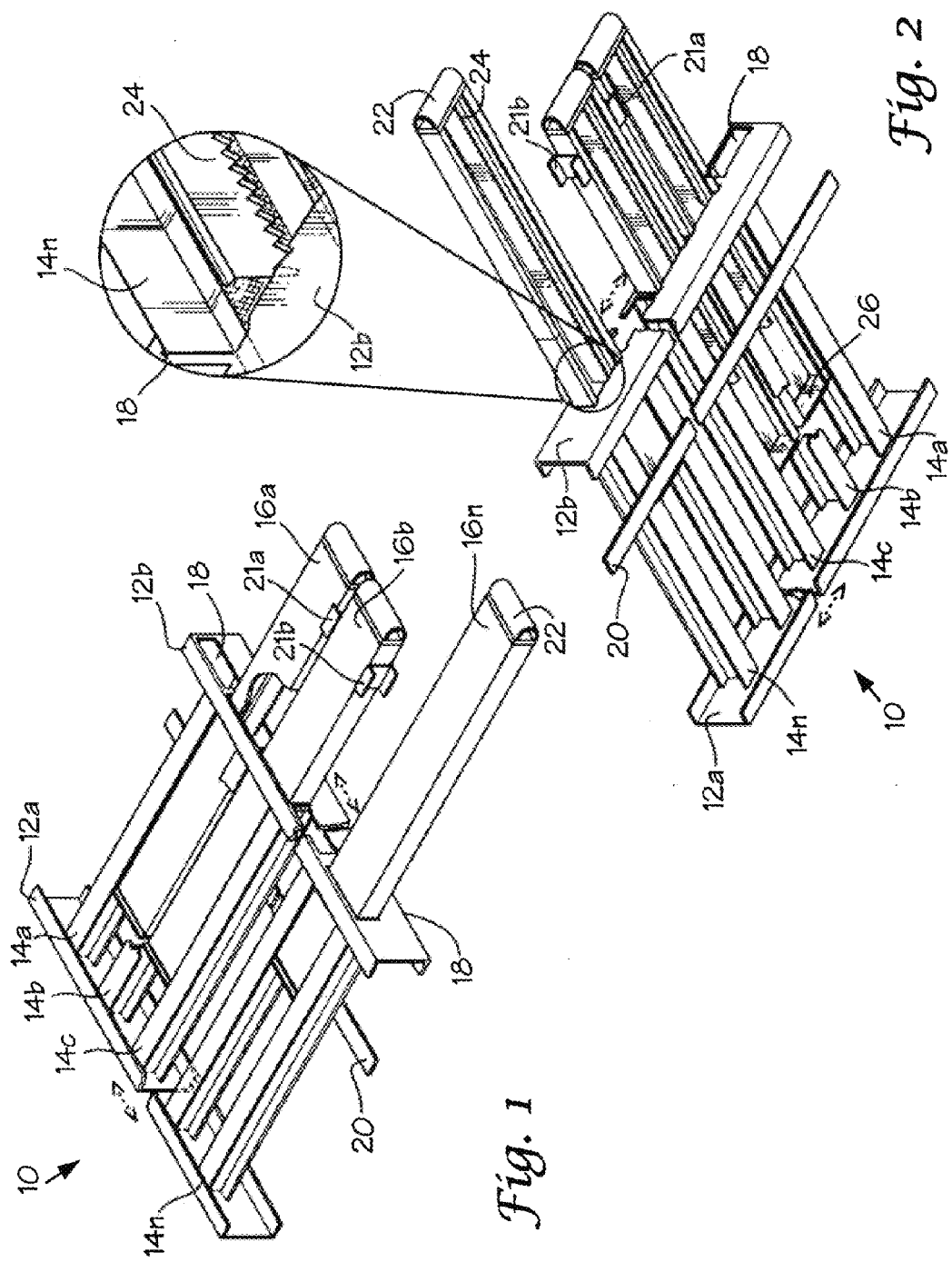

ADJUSTABLE WORK SURFACE FOR LARGE IRREGULARLY SHAPED OBJECTS

The present application is a Divisional of U.S. patent application Ser. No. 12/875,448, filed Sep. 3, 2010, now U.S. Pat. No. 8,499,889.

FIELD OF THE INVENTION

This invention is directed to an adjustable work platform and, more specifically, to a heavy duty extendable platform designed to conform to the outer surfaces of a large, irregularly shaped object such as an aircraft.

BACKGROUND OF THE INVENTION

Maintenance upon large irregularly shaped objects is often difficult because of the cost and difficulty involved in providing safe and reasonably priced work surfaces suited to the outer size and shape of such objects. The variable shapes and sizes of large objects such as aircraft require custom work platforms so that workers can safely reach and work on those objects. Standard scaffolding is designed to facilitate maintenance upon standard rectangular shapes such as brick buildings. Custom scaffolding is known in the art but frequently cost prohibitive given the large variance in the size, shape, and number of objects that must be maintained in a typical setting, such as an airport hanger. To make matters worse, aircraft are subject to tight schedules to remain profitable, so maintenance time must be minimized. What is needed is an adjustable work surface that will accept a range of irregularly sized and shaped large objects quickly, safely, and efficiently.

SUMMARY OF THE INVENTION

The present invention alleviates many of the problems inherent with prior art work surfaces. The invention provides a novel system and method of use for an adjustable work platform that will accept a range of irregularly sized and shaped large objects quickly, safely, and efficiently.

An embodiment of the invention provides an adjustable work platform for carrying heavy loads in a stable manner comprising a fixed platform with a front side and a back side opposite thereto, with a first stringer along the front side comprising defined openings therein, a second stringer along the back side and a multiplicity of I-beam guides spanning between the first stringer and the second stringer, and an adjustable platform extendable from said fixed platform with a slider received by the adjacent I-beam guides and disposed to reversibly extend through one of said openings comprising a toothed member that reversibly engages with the first stringer thereby restricting sliding of said slider, and a back plate attached to the slider to limit the length of extension of said slider through the openings. The toothed member is rotatable about a perpendicular axis to the toothed member. The toothed member is also rotatable about a parallel axis to the toothed member. A back plate on the slider limits the lateral and vertical movement of the slider to provide increased stability of the slider.

A novel method of providing a work platform for carrying heavy loads while accessing an irregularly shaped object comprises the steps of providing an adjustable platform as described above, moving a large object to within a predetermined separation distance of the platform, and extending the adjustable platform from the fixed platform, minimizing the separation distance.

Another embodiment of the invention provides an adjustable walking surface for carrying heavy loads comprising a substantially horizontal platform having a first stringer disposed parallel to a second stringer and the first stringer and second stringer connecting by two or more I-beam guides that are perpendicularly disposed between the first and second stringer, a slider carried between two or more of the I-beam guides where the slider is operable to extend the horizontal length of the platform by pulling a first distal end of the slider through an opening the second stringer. A back plate is disposed upon a second distal end of the slider, where the back plate allows the slider to ravel horizontally along the lengths of the two or more I-beam guides while simultaneously preventing substantial vertical and lateral movement of the slider. A toothed member is disposed upon the downward facing portion of the slider, which operates to contact the lower vertical surface of the opening in the second stringer where a toothed member rests upon the lower vertical surface while the slider is in an extended position to prevent horizontal movement of said slider by force of gravity acting upon the slider until a greater upward force is applied to the first distal end of the slider followed by a horizontal force to extend or retract the slider.

DESCRIPTION OF THE DRAWINGS

FIG. 1 is a perspective top view of an adjustable work platform.

FIG. 2 is a perspective bottom view of an adjustable work platform.

DETAILED DESCRIPTION OF THE INVENTION

Figure 3:
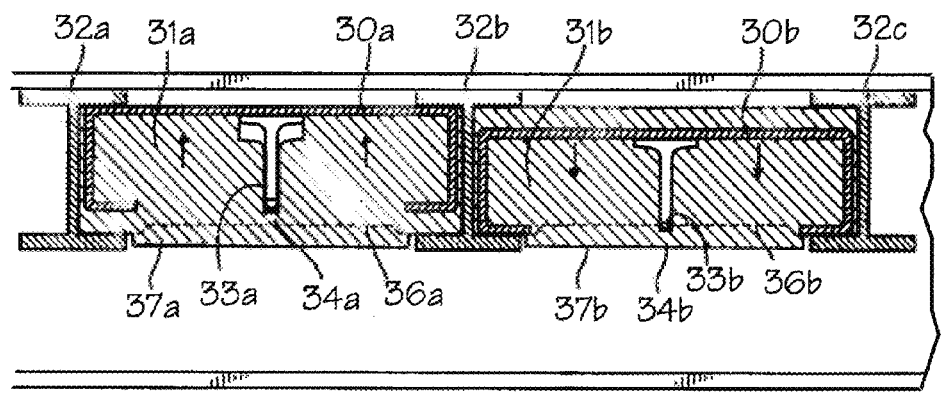
FIG. 3 is a horizontal view of an interior of an adjustable work platform with a fixed toothed member.

Referring now to FIG. 1, a top perspective of an adjustable work platform is illustrated. Adjustable work platform 10 includes two stringers 12a and 12b connected by a series of I-beams 14a, 14b, 14c, continuing to 14n. A multiplicity of sliders 16a, 16b, continuing to 16n are disposed between each of the I-beams. Each slider is extendable outward through opening 18 in stringer 12b. The limit of extension for each slider is reached when a back plate on each slider contacts stop bar 20 or when rubber stop 22 contacts the object to be worked upon. Slider 16b includes a set of stability tabs 21a and 21b, which are disposed on every other slider to increase the stability of all sliders once extended. These c-shaped members attach on the side portions of every other slider and provide a channel for each rectangular slider's extension.

Figure 6:
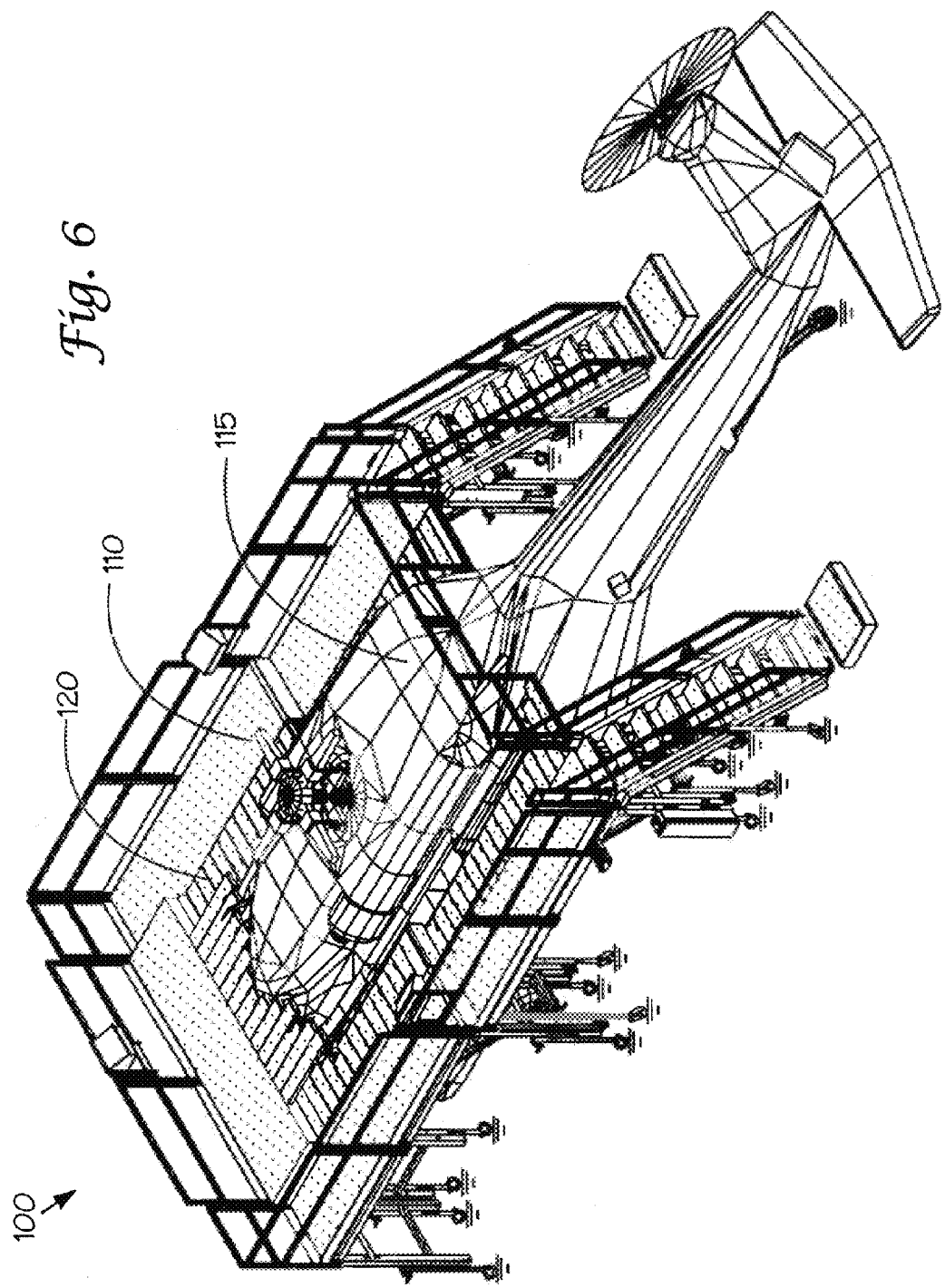
FIG. 6 is a perspective view of an adjustable work platform in use to perform maintenance on a helicopter.

Maintenance personnel can use the adjustable work platform sliders to create a suitably shaped work surface first by pulling a large irregularly shaped object, such as a helicopter, into a work bay with the adjustable work platform 10 disposed on one or more sides of the helicopter as illustrated in FIG. 6. When the helicopter is placed in the center of work platform 10, maintenance personnel then extend each of the sliders 16a to 16n outward by lifting the distal end of each slider and pulling outward to extend each slider through opening 18 until rubber stop 22 contacts the side of the helicopter. The weight of individual sliders, combined with a toothed member 24 illustrated in FIG. 2, holds each slider safely in place along the irregularly shaped outer surface of the helicopter. In this manner, adjustable platform 10 fills the gaps along the outer surface of the helicopter so that a safe and easily adjustable work surface is provided for maintenance on the helicopter.

Referring now FIG. 2, adjustable work platform 10 is shown from a bottom perspective view. Back plate 26 and stop bar 20 are illustrated in more detail. The maximum length of extension of sliders 16a to 16n is limited when back plate 26 contacts stop bar 20. Normally sliders 16a to 16n do not reach their maximum extended length, however, because rubber stop 22 is designed to contact the outer surface of the large irregularly shaped object.

As discussed with respect to FIG. 1, sliders 16a to 16n are positioned around the outer surface of an irregularly shaped object in the following manner. Once the object is placed adjacent to adjustable work platform 10, an operator extends each of the sliders 16a to 16n outward by lifting the distal end of each slider upward and pulling outward to extend each slider through opening 18 until rubber stop 22 contacts the side of the object. Once the desired length of extension of each slider is reached, the operator simply lowers the distal end of the slider so that toothed member 24 then contacts the lower surface of opening 18 on stringer 12b. The rigidity of stringer 12b, which is generally made of metal, combined with the shape and rigidity of the toothed member 24, which is also generally also made of metal, causes slider 16 to remain safely in place by force of its own weight.

Back plate 26 has several purposes. First, it provides a stop mechanism by limiting maximum travel of each slider to stop bar 20 as described above. Second, it provides additional stability by keeping the inner end of each slider firmly placed between each I-beam 14a to 14n. As discussed further with respect to FIG. 3, back plate 26 prevents unwanted lateral and vertical movement of each slider by completely filling the inner space between I-beams 14a to 14n. In this manner, the slider is allowed only minimal vertical travel on the distal end containing rubber stop 22, so that the toothed member pivots perpendicular to its own axis when an operator lifts the end to extend or retract a slider.

Thus an operator may easily and safely vary the length of extension of each slider 16a to 16n by lifting upward on the end of each slider where rubber stop 22 is located and then pulling horizontally outward to increase the length of extension of slider or pushing horizontally inward to decrease the length of extension of slider. Once the user has selected a desired length of extension the user then lowers the distal end of the slider, which then allows toothed member 24 to contact and engage with the lower edge of opening 18, thereby firmly holding the slider in place.

Referring now to FIG. 3, the above operation of each slider is more clearly illustrated looking directly down the length of sliders 30a and 30b disposed within I-beams 32a, 32b, and 32c. Slider 30a on the left has been lifted by an operator to its upward position where it can be retracted or extended, whereas slider 30b on the right is in the locked lower position held firmly in place by contact of toothed member 34b on edge 36b, which represents the lower edge of opening 18 from FIGS. 1 and 2. Toothed members 34a and 34b are located on the bottom of t-shaped members 33a and 33b, which attach to the center of sliders 30a and 30b and project downward.

Vertical and lateral movement of slider 30a and 30b is limited by use of back plates 31a and 31b because the back plates fill the interior spaces between I-beams 32a, 32b, and 32c, as indicated by the shaded portions of FIG. 3. In other words, back plates 31a and 31b are sized to fill the entire space between I-beams 32a, 32b and 32c so that sliders 30a and 30b are held firmly in an upright position without any side-to-side or up and down movement. Although the embodiments of FIGS. 4 and 5 would include a back plate, none is shown so that the other components in FIGS. 4 and 5 can be more clearly illustrated.

Properly sized back plates 31a and 31b allow substantial movement of sliders 30a and 30b in one direction only, which is inward and outward along the interior surfaces of I-beams 32a, 32b, and 32c. For added stability, back plates 31a and 31b also contain a lower lip 37a and 37b along their lower edges designed to fit between the bottom edges of I-beams 32a, 32b, and 32c. It is important to note that, while back plates 31a and 31b prevent vertical movement of the inner portion of each slider (the distal end opposite rubber stop 22), each back plate also allows the small and necessary vertical movement of the outer end of each slider (distal end with rubber stop 22) needed to lift the distal end of each slider to extend or retract the slider. In this manner, each slider is allowed minimal but sufficient vertical travel on the distal end containing rubber stop 22, so that toothed members 34a and 34b pivot perpendicular to their own axis when an operator lifts the end of a slider to extend or retract that slider.

While slider 30a is shown in the lifted position to allow its extension or retraction, slider 30b is shown in the resting position where movement of the slider is prevented. As slider 30b is lowered by an operator into the position shown, toothed member 34b engages the lower edge 36b of the opening of the stringer indicated by the dashed line. As both toothed member 34b and lower edge 36b are both generally made of rigid metal, contact between the two prevents further horizontal extension or retraction of slider 30b. The weight of slider 30b is generally sufficient to maintain the necessary contact between 34b and 36b so that movement of the slider is prevented.

Figure 4:
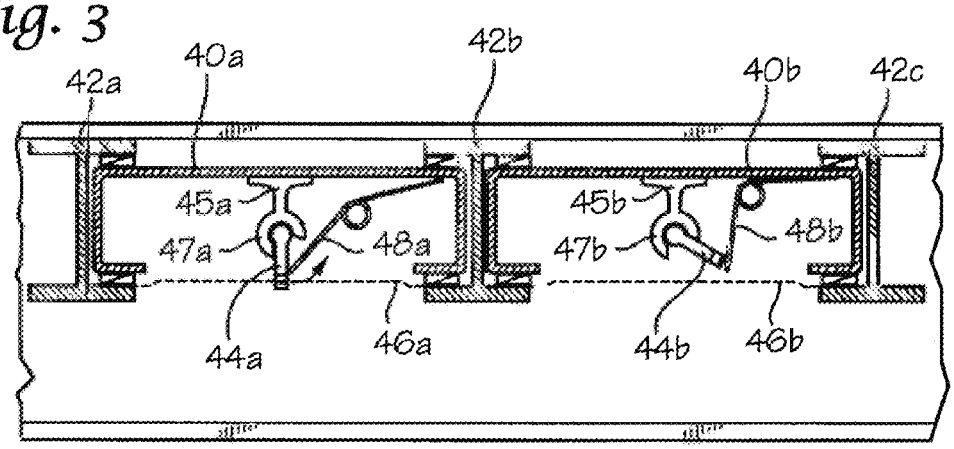
FIG. 4 is a horizontal view of an interior of an adjustable work platform with a pivoting toothed member.

Referring now to FIG. 4, an alternate embodiment of the toothed member is illustrated, wherein the toothed member pivots about its parallel axis and is held in place by a pivoting socket and compressible spring. I-beams 42a, 42b, and 42c hold sliders 40a and 40b in place. Slider 40a is shown with the pivoting toothed member 44a at rest and held in place by spring 48a. T-shaped member 45a contains a pivoting socket 47a designed to receive toothed member 44a and to allow toothed member 44a to pivot so that the toothed member is rotatable about its parallel axis. This differs from the fixed-toothed member 33a shown in FIG. 3, which rotates about a perpendicular axis to engage and disengage.

Slider 40b is illustrated with pivoting toothed member 44b rotated into an unlocked position, whereby spring 48h is compressed. Toothed member 44b may be rotated from locked to unlocked in a number of ways. In one embodiment, an operator may simply reach under the edge of rubber stop 22 (shown in FIGS. 1 and 2) and apply upward lateral pressure on toothed member 44b to compress spring 48b and rotate toothed member 44b about its parallel axis into the retracted position as shown. In this manner toothed member 44b no longer contacts edge 46b so that slider 40b is free to be extended or retracted as desired.

Figure 5:
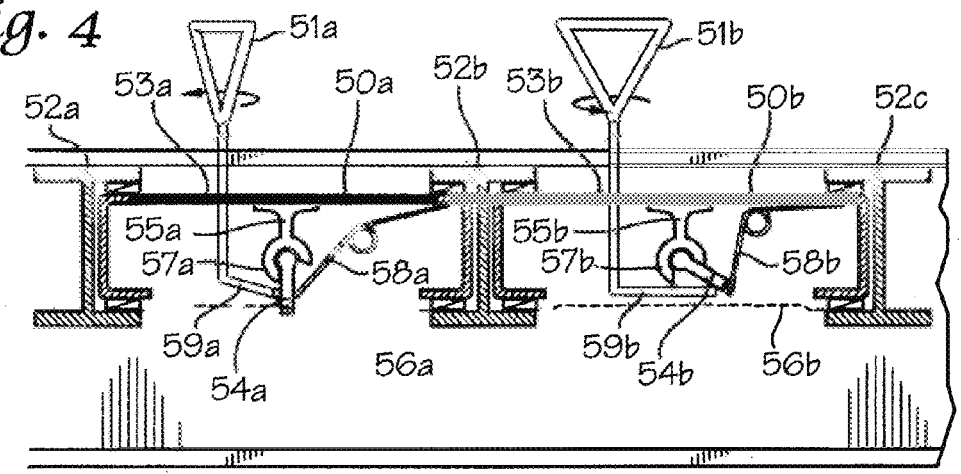
FIG. 5 is a horizontal view of an interior of an adjustable work platform with a pivoting toothed member and release bar.

Referring now to FIG. 5, another embodiment is illustrated for engaging a pivoting toothed member. Operator handle 51a is inserted into opening 53a and placed in its operating position so that distal end 59a is in contact with a side portion of toothed member 54a. The operator may then twist the handle 51b as shown on the right so that distal end 59b contacts the edge of 54b, thereby pivoting toothed member 54b so that it rotates about its parallel axis. This movement unlocks slider 50b by preventing contact of toothed member 54b with edge 56b so that an operator is then free to extend or retract slider 50b in normal use.

Once slider 50b is extended or retracted into a desired position, the operator then twists the handle 51b in the opposite direction to return the toothed member to its resting position, as indicated by 54a. Compression springs 58a and 58b resist the rotation of toothed members 54a and 54b to force toothed members 54a and 54b back into a vertical position, as illustrated by 54a, once the operator twists the handle back to its original position, as indicated by 51a.

Referring to FIG. 6, an embodiment of the invention in use is illustrated to provide a three-sided adjustable work platform 100 for maintenance on a helicopter. Work platform 100 comprises two primary sections—fixed platform 110 and adjustable platform 120. Fixed platform 110 holds the various sliders described above. Once helicopter 115 is rolled into position at the center of work platform 100, those sliders are extended to form the adjustable platform 120 around the irregular outer surface of helicopter 115 as illustrated in FIG. 6. In this manner, a safe, inexpensive, and quickly established adjustable work surface is provided to facilitate maintenance on the helicopter.

These illustrated examples are offered by way of illustration of the invention's versatility and not meant to limit the invention in any way. The present invention may be embodied in other specific forms without departing from its spirit of essential characteristics. The described embodiments are to be considered in all respects only illustrative and not restrictive. The scope of the invention is therefore indicated by the appended claims rather than by the foregoing description. All changes which come within the meaning and scope of equivalency of the claims are to be embraced within their scope.

What is claimed is:

1. A work platform assembly for carrying heavy loads in a stable manner comprising:

a fixed platform with a front side and a back side opposite thereto comprising:
   a first stringer along said front side comprising defined openings therein;
   a second stringer along said back side; and
   a multiplicity of I-beams functioning as guides spanning between said first stringer and said second stringer; and an adjustable platform extendable from said fixed platform comprising:
   a plurality of sliders, each said slider received by respective adjacent I-beam guides and disposed to reversibly extend through a respective one of said openings, each said slider comprising:
     a toothed member attached to said slider that reversibly engages with said first stringer to restrict sliding of said slider and to permit sliding when not engaged;
     a stop bar traversing said I-beam guides above said slider;
     a back plate attached to said slider, to limit the length of extension of said slider beyond said stop bar, and;
     said adjustable platform perimeter comprising three straight sides and a fourth side that is configurable between a straight or stepped edge.

2. The work platform of claim 1 wherein said toothed member is rotatable about a perpendicular axis to said toothed member.

3. The work platform of claim 1 wherein said toothed member is rotatable about a parallel axis to said toothed member.

4. The work platform of claim 1 wherein said back plate limits the lateral and vertical movement of said slider to provide increased stability of said slider.

* * * * *